(12) United States Patent
Altunbasak et al.

(10) Patent No.: US 7,440,502 B2
(45) Date of Patent: Oct. 21, 2008

(54) SIGNAL PROCESSING SYSTEM

(75) Inventors: Yucel Altunbasak, Norcross, GA (US);
Hyungjoon Kim, Alpharetta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 785 days.

(21) Appl. No.: 10/706,395

(22) Filed: Nov. 12, 2003

(65) Prior Publication Data

US 2004/0095997 A1    May 20, 2004

Related U.S. Application Data

(60) Provisional application No. 60/426,163, filed on Nov. 14, 2002.

(51) Int. Cl.
*H04N 7/12* (2006.01)
*H04N 11/02* (2006.01)
*H04N 11/04* (2006.01)
*H04B 1/66* (2006.01)

(52) U.S. Cl. .................................. 375/240.24
(58) Field of Classification Search ................. 375/240.01–240.29
See application file for complete search history.

(56) References Cited

U.S. PATENT DOCUMENTS

| | | | | |
|---|---|---|---|---|
| 5,036,669 A * | 8/1991 | Earleson et al. | ................ | 60/602 |
| 5,301,242 A * | 4/1994 | Gonzales et al. | ............ | 382/239 |
| 5,737,481 A * | 4/1998 | Gushima et al. | ............ | 386/113 |
| 5,929,916 A * | 7/1999 | Legall et al. | ........... | 375/240.05 |
| 6,037,987 A | 3/2000 | Sethuraman | ................. | 348/415 |
| 6,160,846 A | 12/2000 | Chiang et al. | .......... | 375/240.05 |
| 6,192,081 B1 | 2/2001 | Chiang et al. | .......... | 375/240.16 |
| 6,243,497 B1 | 6/2001 | Chiang et al. | ............... | 382/251 |
| 6,249,318 B1 | 6/2001 | Girod et al. | ................ | 348/416 |
| 7,023,924 B1 * | 4/2006 | Keller et al. | ........... | 375/240.26 |
| 2003/0067981 A1* | 4/2003 | Zhao et al. | ............. | 375/240.08 |

OTHER PUBLICATIONS

Hyungjoon Kim, Nejat Kamaci, Yucel Altunbasak, "Low Complexity Rate-Distortion Optimal Macroblock Mode Selection and Motion Estimation for MPEG-Like Video Coders."
PCT International Search Report.
Yucel Altunbasak et al; "Low-Complexity Rate-Distortion Optimal Macroblock Mode Selection for MPEG-like Video Coders," IEEE ICME; p. III-513-III-516; Jul. 2003; Baltimore, MD.

* cited by examiner

*Primary Examiner*—Nhon T Diep
(74) *Attorney, Agent, or Firm*—Thomas, Kayden, Horstemeyer & Risley, LLP; Scott A. Horstemeyer

(57) ABSTRACT

Methods and systems are disclosed for a video system. In a first exemplary embodiment, the video system comprises a video processing circuit that receives a picture and provides video compression by using an optimal macroblock mode of operation, the optimal macroblock mode of operation being identified by processing at least one macroblock of the picture, the processing being performed independent of other macroblocks contained in the picture. Additionally, the video processing circuit comprises a mode selection circuit that identifies the optimal macroblock mode of operation by using a rate-distortion model. The rate-distortion model incorporates an overall macroblock mode distortion D that is defined as the sum of $D^{AC}$ a distortion due to AC coefficients, and $D^{DC}$ a distortion due to DC coefficients.

18 Claims, 3 Drawing Sheets

SIGNAL PROCESSING SYSTEM

CROSS REFERENCE TO RELATED APPLICATIONS

This application claims the benefit of U.S. Provisional Patent Application Ser. No. 60/426,163, filed Nov. 14, 2002, which is incorporated herein by reference in its entirety.

FIELD OF THE INVENTION

The present invention generally relates to the field of signal processing systems. More specifically it relates to video compression and encoding systems.

BACKGROUND

Large bandwidth systems, such as video processing systems, strive to obtain high compression ratios by eliminating spatial and temporal redundancies in transmitted pictures. Spatial redundancy refers to redundant video information that is present within a single picture. One example of spatial redundancy can be found in the repeated pixel values that are present inside a single picture of a large expanse of blue sky. Temporal redundancy, on the other hand, refers to redundant video information that is present in successively occurring pictures where certain parts of the picture do not vary from one picture to the next. One such example of temporal redundancy can be found in an expanse of blue sky that is present in two successive pictures that are to be transmitted sequentially.

Spatial redundancies may be eliminated by using compression techniques, such as discrete cosine transform (DCT) and wavelet transform (WT), while temporal redundancies may be eliminated by using compression techniques that incorporate, for example, motion compensated temporal prediction. Alternative techniques, such as hybrid motion-compensated transform coding algorithms, utilize a combination of spatial and temporal compression techniques. These hybrid techniques are typically used to implement motion picture expert group (MPEG) standards, such standards being collectively referred to as "MPEG-x," where 'x' is a numeric value.

When temporal compression is used, a current picture is not transmitted in its entirety; instead, the difference between the current picture and a previous picture is transmitted. At the receiver end, a decoder that already has the previous picture, can then reconstruct the current picture by adding the difference picture to the previous picture. The difference picture is created at the transmitter by subtracting every pixel in one picture from the corresponding pixel in another picture. Such a difference picture is an image of a kind, although not a viewable one, and contains some spatial redundancies, which may be eliminated by using spatial compression techniques.

The difference picture may not contain a large amount of data when stationary objects are present in sequential pictures, but when moving objects are present in successive frames the resulting difference picture will obviously, contain a significant amount of data. Generation of such large amounts of data may be minimized by using motion compensation techniques that can be used in conjunction with the generation of the difference picture. In MPEG-2 implementations, for example, motion compensation is typically accomplished using a motion estimator circuit. The motion estimator circuit measures the direction and distance of motion between two pictures and outputs the results as motion vectors. These motion vectors are used by the decoder at the receiver end to carry out motion compensation by shifting data in a previous picture to create the current picture.

In effect, the motion vectors describe the optical flow axis of a certain moving screen area, along which axis the image is highly redundant. Vectors are bipolar codes which reflect the amount of horizontal and vertical shift required at the decoder.

An added level of complexity occurs during motion compensation in real-world images such as those encountered in MPEG implementations, because moving objects do not necessarily maintain their appearance as they move. For example, objects may turn, move into shade or light, or move behind other objects. Consequently, motion compensation cannot be implemented in an ideal manner, and supplementary information related to the picture has to be provided to the decoder. This supplementary information takes the form of a "predicted picture" that is also typically generated in the motion estimator circuit.

Consequently, the motion estimator circuit, in addition to producing the motion vectors, also uses the motion vectors to produce the predicted picture, which is based on the previous picture shifted by motion vectors. This predicted picture is then subtracted from the actual current picture to produce a "prediction error." The prediction error is also often referred to as a "prediction residual."

Several existing systems have been designed to obtain motion vectors by carrying out a motion search. This motion search employs a strategy that is geared towards producing a picture residual that has the least amount of data transmission bandwidth under the assumption that such a search strategy produces the most efficient compression. Unfortunately, while the bandwidth of the picture residual may be optimized by this approach, the bandwidth of the generated motion vectors can also turn out to be significant. It is therefore desirable to provide a solution that not only optimizes the bandwidth of the prediction residual, but of the motion vectors as well. Optimizing both the prediction residual as well as the motion vectors translates to providing optimal compression, which consequently equates to an optimal data transmission rate.

In addition to employing motion compensating techniques, video processing systems also employ encoding circuitry that operate upon signals such as the prediction residual and the motion vectors, to produce encoded data. This encoding process is dependent upon the nature of the signals, and is typically geared towards optimizing one or more signal parameters such as the signaling rate (bandwidth), picture distortion, or a combination of rate and distortion.

For example, MPEG pictures contain pixel blocks that are commonly referred to as macroblocks, which can be encoded in multiple ways. Two such modes are referred to as "intracode mode" and "bidirectional mode" operation. In a first implementation, the encoding process is selected so as to minimize the transmission rate (consequently the signaling bandwidth) of a transmitted signal, while in a second encoder implementation, the encoding process is selected to minimize picture distortion. Picture distortion may be described as a measure of either the perceived or actual difference between the original and the encoded video picture.

A third approach to implementing an encoder, uses a combination of bit rate R and distortion D, in what is referred to as a "rate-distortion" (R-D) approach, with the goal of minimizing distortion under the limitation of a pre-defined rate constraint. The rate-constrained approach can be defined by the equation:

$\min\{D(R)\}$ subject to $R \leq R^*$, where $R^*$ is the allowed rate.

This equation can be converted to one having an unconstrained rate by using a Lagrangian multiplier λ. The unconstrained Lagrangian formula is defined by the following equation:

$$\min\{J(D,R)\}, \text{ where } J=D+\lambda R.$$

The minimization process to determine the optimal values of R and D for various values of λ can turn out to be computationally extensive, as well as expensive, if each and every encoding mode as well as motion estimation/compression process has to be evaluated using the equation above. Consequently, while several solutions currently exist to implement rate-distortion theory in macroblock mode selection as well as in motion estimation schemes, these solutions suffer from sub-optimal results and/or are computationally complex.

It is therefore desirable to provide a signal processing system that implements macroblock mode selection and/or motion estimation with reduced computational complexity.

SUMMARY OF THE INVENTION

The present invention provides methods and systems for a video system. In a first exemplary embodiment, among others, the video system comprises a video processing circuit that receives a picture and provides video compression by using an optimal macroblock mode of operation, the optimal macroblock mode of operation being identified by processing at least one macroblock of the picture, the processing being performed independent of other macroblocks contained in the picture. Additionally, the video processing circuit comprises a mode selection circuit that identifies the optimal macroblock mode of operation by using a rate-distortion model. The rate-distortion model incorporates an overall macroblock mode distortion D that is defined as the sum of $D^{AC}$ a distortion due to AC coefficients, and $D^{DC}$ a distortion due to DC coefficients.

In a second exemplary embodiment, the disclosure provides a method for video compression. One such method, among others, can be summarized by the following steps: identifying an optimal macroblock mode of operation by processing a macroblock independent of other macroblocks contained in the picture. Additionally, the method of identifying the optimal macroblock mode of operation comprises providing a rate-distortion model, computing a set of rate-distortion values using a set of macroblock modes of operation upon the rate-distortion model, selecting from the set of rate-distortion values an optimal rate-distortion value, and designating the macroblock mode of operation corresponding to the optimal rate-distortion value as the optimal macroblock mode of operation.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

DESCRIPTION OF THE DRAWINGS

Many aspects of the invention can be better understood with reference to the following drawings. The components in the drawings are not necessarily drawn to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

While the description below refers to certain exemplary embodiments, it is to be understood that the invention is not limited to these particular embodiments. On the contrary, the intent is to cover all alternatives, modifications and equivalents included within the spirit and scope of the invention as defined by the appended claims. Also, the terminology used herein is for the purpose of description and not of limitation.

Figure 1:
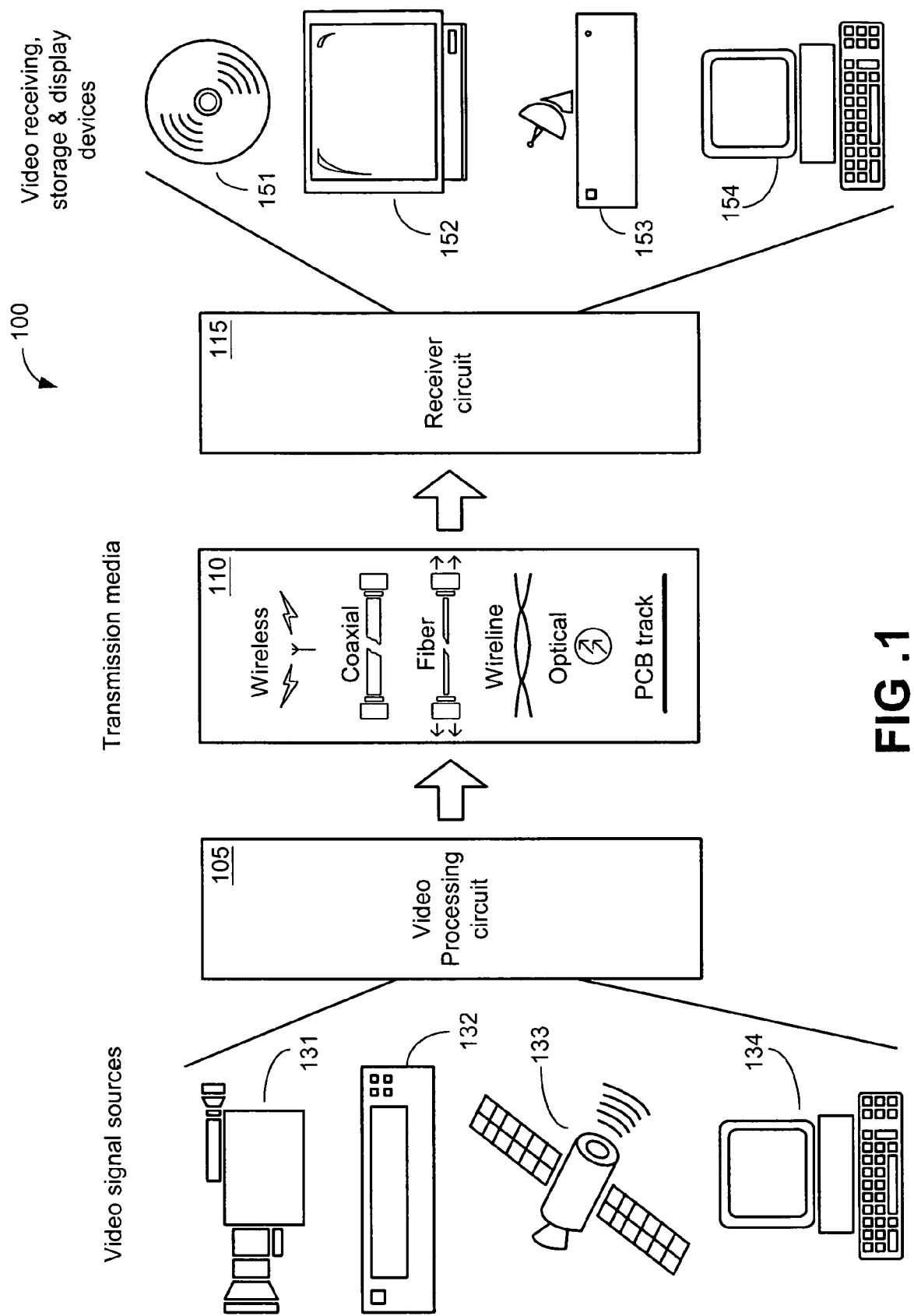
FIG. 1 illustrates a video system that includes a video processing circuit to provide signal compression and encoding.

FIG. 1 illustrates a video system 100 comprising a video processing circuit 105, a transmission media 110, and a receiver circuit 115. Video system 100 is representative of several signal processing systems where signal compression and/or signal encoding processes are employed. Some examples of such systems include television systems, satellite systems, digital video disk (DVD) players, cable television systems, and computer systems. Transmission media 110 encompasses several forms of signal-carrying media, including but not limited to, wireless links, co-axial cable, optical fiber, copper-wire, free-space optics, and metallic tracks on a printed circuit board (PCB).

In one exemplary system, a video signal is sourced from a video camera 131 that is communicatively coupled to a video processing circuit 105. The video processing circuit 105, which may optionally be housed inside video camera 131, is connected via a transmission media that is comprised of a co-axial connection to a receiver circuit 115, which may optionally be housed inside a television set 152. Video processing circuit 105 provides signal compression and encoding for the video signal that has to be transmitted, in this example, over a large distance via the coaxial connection. Typically, the coaxial connection has a limited signal-carrying bandwidth—hence the need for the video processing circuit 105 to carry out signal compression among its multiple functions.

In a second example, the video camera 131 is replaced by a video player/recorder 132 that may be located in a cable TV provider's facility to provide television signals (or movies-on-demand) to a customer residence that houses television 152 containing receiver circuit 115. In this instance, the coaxial connection is shared by multiple customers, and consequently, the bandwidth available for transmitting a signal from the video player/recorder 132 to one of the multiple customers, which in this case owns television 152, may be significantly limited below the overall signal-carrying bandwidth of the coaxial cable.

A third example can be illustrated by a video signal that is compressed and encoded in video processing circuit 105, when housed inside satellite 133. This video signal is then transmitted through the air in a wireless medium, to a receiver circuit 115 that is located inside a set-top box 153.

In yet another example, a video processing circuit 105 that is housed inside personal computer (PC) 134 accepts an input video signal that is provided to the PC via a user-accessible connector, such as an IEEE-1394 connector. This video signal is suitably compressed and encoded by video processing circuit 105 prior to transmission through a PCB track. The video signal is received in receiver circuit 115, which is also located inside PC 134, where it is decoded prior to recording on to a digital video disc 151 that may be inserted into PC 134.

The aforementioned examples are intended to provide some examples of video systems, and persons of ordinary skill in the art will recognize that there are many other such systems incorporating signal compression and encoding schemes.

Figure 2:
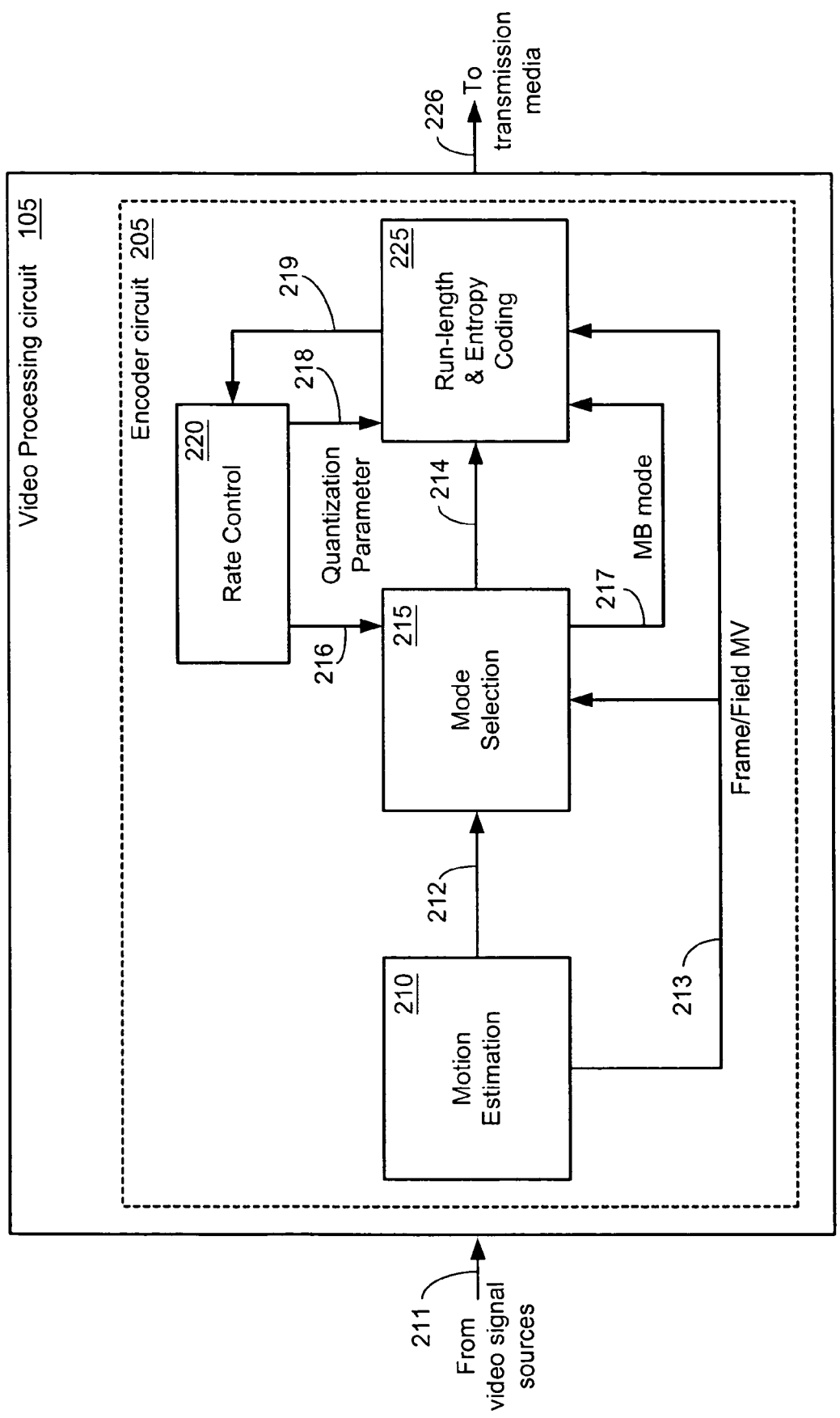
FIG. 2 shows the main functional blocks of the video processing circuit of FIG. 1.
Figure 3:
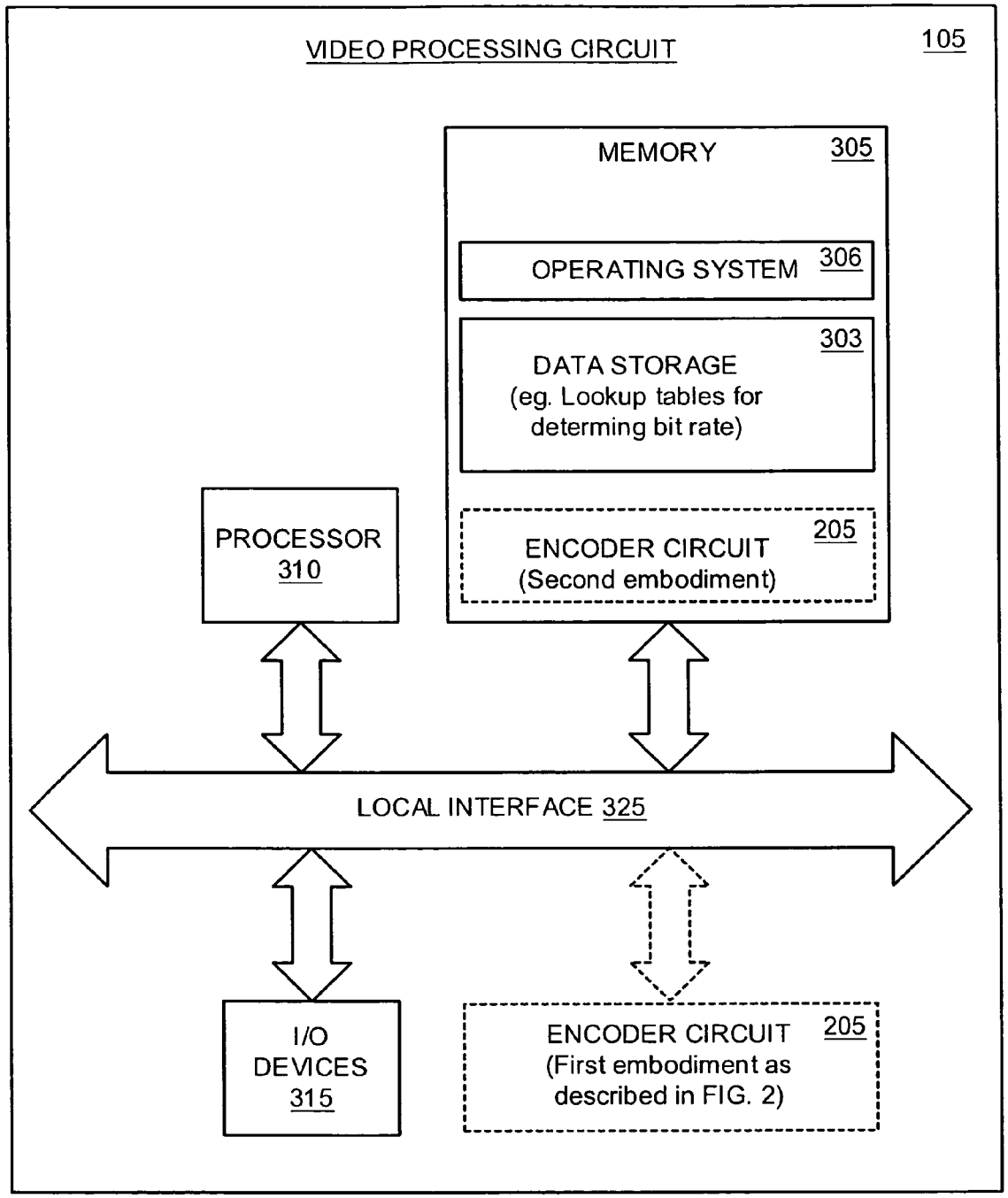
FIG. 3 shows some functional blocks of a computer system that interfaces to a video processing system such as the video processing system of FIG. 1, to provide computational capabilities for carrying out a signal compression and encoding.

The theoretical basis for operation of the video processing circuit 105 will now be presented, followed by implementation details that are explained using FIGS. 2 and 3. In this connection, attention is drawn to the following paper that is herein incorporated by reference in its entirety:

"*Low complexity rate-distortion optimal macroblock mode selection and motion estimation for MPEG-like video coders*" by Hyungjoon Kim, Nejat Kamaci, and Yucel Altunbasak.

A generalized equation that may be used to define a rate-distortion (R-D) model is given by the following equation:

$$D(R) = \eta f(\sigma) g(R),$$

where $\eta$ is a number, and the other two terms are function terms. The number $\eta$ may be a fixed constant, or a pre-computed/pre-determined/pre-estimated number. Alternatively, the number $\eta$ may be a number that is adaptively adjusted during processing of any one of one or more frames of a picture.

The (R-D) model equation may be further described in an alternative form as:

$$D(R) = \eta \sigma^\beta e^{-\gamma R} \qquad \text{Equation (1)}$$

where $\sigma$ denotes the standard deviation of the source, and $\eta$, $\beta$, $\gamma$ are unknown, model parameters that may be numerical values that are chosen as fixed constants, pre-computed/pre-determined/pre-estimated numbers, or are adaptively adjusted during processing of any one of one or more frames of a picture.

When $\eta=1$ and $\beta=2$, Equation (1) may be resolved using two methods of estimating $\gamma$. First, average values of distortions, rates and variances of all macroblocks are used in estimation. Let $(D_{act,\, intra}, R_{act,\, intra}, \sigma^2_{act,\, intra})$ be the actual distortion, rate and source variance of the last intra coded frame, respectively. And let $(D_{act,\, inter}, R_{act,\, inter}, \sigma^2_{act,\, inter})$ be the actual distortion, rate and source variance of the last non-intra coded frame, respectively. Then, the estimates of $\gamma$ are:

$$\gamma_{intra} = \frac{1}{R_{act,intra}} \ln\left(\frac{\sigma^2_{act,intra}}{D_{act,intra}}\right) \qquad \text{Equation (2)}$$

$$\gamma_{inter} = \frac{1}{R_{act,inter}} \ln\left(\frac{\sigma^2_{act,inter}}{D_{act,inter}}\right) \qquad \text{Equation (3)}$$

In the second method to estimate $\gamma$ uses the average $\gamma$ of each macroblock. The estimates of $\gamma$ may be expressed as:

$$\gamma_{intra} = \frac{1}{N}\sum_i^N \gamma_{i,intra} = \frac{1}{N}\sum_i^N \frac{1}{R_{i,act,intra}} \ln\left(\frac{\sigma^2_{i,act,intra}}{D_{i,act,intra}}\right)$$

$$\gamma_{inter} = \frac{1}{N}\sum_i^N \gamma_{i,inter} = \frac{1}{N}\sum_i^N \frac{1}{R_{i,act,inter}} \ln\left(\frac{\sigma^2_{i,act,inter}}{D_{i,act,inter}}\right)$$

where $(D_{i,act,\, intra}, R_{i,act,\, intra}, \sigma^2_{i,act,\, intra})$ are distortion, rates, and source variance of the intra coded $i^{th}$ macroblock, respectively, and $(D_{i,act,\, inter}, R_{i,act,\, inter}, \sigma^2_{i,act,\, inter})$ are distortion, rates, and source variance of the non-intra coded $i^{th}$ macroblock, respectively.

In an alternative approach, instead of carrying out an estimation of $\gamma$ values, a lookup table containing values of $\gamma$ for a given frame bit budget may be used.

The R-D model of Equation (1), may be used to carry out optimal macroblock mode selection, mode decision, and/or motion estimation, as explained below.

Optimal Macroblock Mode Selection

Let $m_I$ be the coding mode of the $i^{th}$ macroblock, ($i=1, 2, \ldots, N$), and let $M_N$ be the set of the modes of all macroblocks. Then, $M_N = \{m_1, m_2, \ldots, \}$, where $m_I$ is the mode of $i^{th}$ macroblock.

The R-D optimal set of the modes ($M_N^*$) for the group of N macroblocks is formulated as:

$$M_N^* = \underset{M_N}{\operatorname{argmin}} D(M_N) = \underset{M_N}{\operatorname{argmin}} \sum_{i=1}^N D_i(m_i), \qquad \text{Equation (4)}$$

subject to $$R(M_N) \leq R^{total}, \qquad \text{Equation (5)}$$

where $$D(M_N) = \sum_{i=1}^N D_i(m_i)$$

and $$R(M_N) = \sum_{i=1}^N R_i(m_i)$$

represent the sum of the distortions and the rates of N macroblocks, respectively. $D_i(m_i)$ denotes the distortion with the $i^{th}$ macroblock coded in the mode $m_i$. Similarly, $R_i(m_i)$ represents the rate of the macroblock in the mode $m_i$. $R^{total}$ is the available total bit budget to encode the set of N macroblocks. The bit budget is shared to encode the discrete cosine transform (DCT), the motion vector and the header information.

Consequently, Equation (5) can be re-written as:

$$R(M_N) = \sum_{i=1}^{N} R_i^{mv}(m_i) + \sum_{i=1}^{N} R_i^{dct}(m_i) + \sum_{i=1}^{N} R_i^{hdr}(m_i) + R^{misc}, \quad \text{Equation (6)}$$

where $R_i^{mv}(m_i)$, $R_i^{dct}(m_i)$, and $R_i^{hdr}(m_i)$ denote the motion vector, the DCT, and the header coding rates respectively, that are associated with the $i^{th}$ macroblock when it is coded in mode $m_i$. $R^{misc}$ is represents the rate for coding other information such as sequence/picture/slice header data that is not relevant to the macroblocks. Setting N equal to the total number of macroblocks in a frame, and solving the constrained minimization problem of Equation (4) using Viterbi-type algorithms will yield the R-D optimal set of macroblock modes for the given frame. However, this is achieved at the expense of high computational complexity. To avoid such high computational complexity, the current macroblock mode $m_i$ is assumed to be independent of any of the other macroblocks. Thus, the minimization constraint of Equation (4) can be rewritten as:

$$M_N^* = \quad \text{Equation (7)}$$
$$\{m_1^*, m_2^*, \ldots, m_N^*\} = \{m_i^* = \operatorname*{argmin}_{m_i} D_i(m_i), i = 1, 2, \ldots, N\},$$

subject to $$\sum_{i=1}^{N} R_i^{mv}(m_i) + \sum_{i=1}^{N} R_i^{dct}(m_i) + \sum_{i=1}^{N} R_i^{hdr}(m_i) + R^{misc} \leq R^{total}. \quad \text{Equation (8)}$$

Further simplification is possible under the assumption that the target total number of bits for the $i^{th}$ macroblock $R_i^{total}$ is known. With this assumption, the rate constraint simplifies to:

$$R_i^{mv}(m_i) + R_i^{dct}(m_i) + R_i^{hdr}(m_i) \leq R_i^{total}, \forall i = 1, \ldots, N. \quad \text{Equation (9)}$$

Thus, coding mode ($m_i^*$) of each macroblock is obtained by solving the following constrained minimization problem:

$$m_i^* = \arg\min D_i(m_i),$$

subject to $$R_i^{mv}(m_i) + R_i^{dct}(m_i) + R_i^{hdr}(m_i) \leq R_i^{total}. \quad \text{Equation (10)}$$

The optimal mode for the $i^{th}$ macroblock ($m_i^*$) can be determined by explicitly computing the distortion for each mode by encoding the macroblock. However, this process may be computationally inefficient, although relatively simpler compared to the case where all macroblocks are considered jointly. To alleviate the problem of evaluating the distortion for each mode, an R-D model is used instead. In general, the overall coding distortion of a macroblock is composed of the distortions due to the quantization of the DC coefficient and the AC coefficients. The reason for separate treatment of the DC and the AC coefficients is that the encoding of the DC coefficient in an intra-type macroblock is different than the rest of the DCT coefficients. For an intra-type macroblock, the DC coefficients of the macroblock are quantized with a fixed step size (either 1, 2 or 4 depending on the DC precision determined by the user) and differently encoded. Thus, macroblock distortion can be re-written as:

$$D_i(m_i) = D_i^{DC}(m_i) + D_i^{AC}(m_i). \quad \text{Equation (11)}$$

wherein $D_i^{DC} = 0$ for all non-intra modes. The actual value of $D_i^{DC}(m_i)$ may be calculated without going through the encoding process. For the AC component of the distortion, the following R-D equations are used:

$$D_i^{AC}(m_i) = \quad \text{Equation (12)}$$
$$\begin{cases} \sigma_i^2(m_i) e^{-\gamma_{intra} R_i^{AC}(m_i)} & \text{if } m_i \text{ is an intra mode,} \\ \sigma_i^2(m_i) e^{-\gamma_{inter} R_i^{AC}(m_i)} & \text{if } m_i \text{ is an intra mode,} \end{cases}$$

for a given mode $m_i$. In this equation, $\gamma$ takes different values for intra and non-intra coding, and $\sigma_i^2(m_i)$ is the variance of the AC coefficients, which depends on the mode $m_i$. When Equation (12) is substituted into Equation (11), the following is obtained:

$$D_i(m_i) = D_i^{DC}(m_i) + \sigma_i^2(m_i) e^{-\gamma(m_i)(R_i^{total} - R_i^{mv}(m_i) - R_i^{hdr}(m_i) - R_i^{DC}(m_i))}, \quad \text{Equation (13)}$$

with $R_i^{AC} = R_i^{total} - R_i^{mv} - R_i^{hdr} - R_i^{DC}$.

Using this model in the optimization problem formulated in Equation 10:

$$m_i^* = \operatorname*{argmin}_{m_i} \{ D_i^{DC}(m_i) + \quad \text{Equation (14)}$$
$$\sigma_i^2(m_i) e^{-\gamma(m_i)[R_i^{total} - R_i^{mv}(m_i) - R_i^{hdr}(m_i) - R_i^{DC}(m_i)]} \}.$$

Equation (14) formulates the rule for choosing the best coding mode for the $i^{th}$ macroblock.

Joint Mode Decision and Motion Estimation

Encoding performance may be improved by applying rate-distortion optimization in the motion estimation. Let $E_i$ be the mean absolute error between the $i^{th}$ original macroblock and the reference macroblocks. Clearly, $E_i$ depends on the selected motion vector. Also, let $R_i^{mv}$ be the motion vector rate for the selected motion vector. The R-D optimal motion estimation may be viewed as estimating the motion vector that minimizes $E_i$, subject to a motion vector rate constraint. The constrained problem may be converted to an unconstrained problem using a Lagrangian multiplier, thus, the R-D optimal motion vector for the $i^{th}$ macroblock is selected so as to minimize the Lagrangian cost function $$J_i = E_i + \lambda R_i^{mv},$$

where $\lambda$ is the unknown Lagrangian multiplier. $\lambda$ can be viewed as a factor that determines the relative importance of the distortion terms. If $\lambda = 0$, then the rate constraint is ignored.

In a second approach, a set of $\lambda$ values, $\lambda_1, \lambda_2, \ldots, \lambda_M$, is used and motion vectors that minimize the cost $J_i$ are selected. That is, for each $\lambda_k$, $k = 1, 2, \ldots, M$, a motion vector $MV_k$ can be determined that minimizes the cost function $J_{i,k} = E_{i,k} + \lambda_k R_{i,k}^{mv}$, where $R_{i,k}^{mv}$ is the number of motion vector bits required to encode $MV_k$ for $i^{th}$ macroblock. This process will result in a maximum of M candidate motion estimates. The motion vector estimate for different $\lambda_k$ values may be identical in certain cases. The mode decision and motion estimation may then be combined by using all candidate motion vectors determined for each $\lambda_k$ and optimizing the macroblock mode and the motion vectors together by evaluating all possible cases by extending Equation (14) as:

$$(m_i^*, MV_i^*) = \arg\min_{m_i, MV_i, k}\{D_{i,k}^{D,C}(m_i) + \sigma_{i,k}^2(m_i)e^{-\gamma(m_i)[R_i^{total} - R_{i,k}^{mv}(m_i) - R_i^{hdr}(m_i) - R_i^{DC}(m_i)]}\}$$

Equation (15)

Estimation of Standard Deviation σ of the Source

Because DCT coefficients are not available before macroblock mode selection, standard deviation of the source can be estimated. The standard deviation of the source can be calculated by using $$\sigma = \sqrt{\frac{1}{N-1}\left(\sum_{k=0}^{N-1} X_k^2 - \frac{\left(\sum_{k=0}^{N-1} X\right)^2}{N}\right)}$$

Equation (16)

where $X_k$ is a DCT coefficient and N is total number of coefficients. There are two possible methods of estimation. By using Parseval's theorem, $$\sum_{k=0}^{N-1} X_k^2 = \sum_{k=0}^{N-1} x_k^2$$

where $x_k$ is a pixel value, Equation (16) can be expressed as $$\sigma = \sqrt{\frac{1}{N-1}\left(\sum_{k=0}^{N-1} x_k^2 - \frac{\left(\sum_{k=0}^{N-1} X\right)^2}{N}\right)}$$

Equation (17)

With assumption that sum of DCT coefficients are very small, Equation (17) can be simplified to $$\sigma = \sqrt{\frac{1}{N-1}\left(\sum_{k=0}^{N-1} x_k^2\right)}$$

Based on another assumption that DC coefficients $X_0$ is much larger than AC coefficients, Equation (17) can be expressed as $$\sigma = \sqrt{\frac{1}{N-1}\left(\sum_{k=0}^{N-1} x_k^2 - \frac{X_0^2}{N}\right)}$$

Equation (18)

By definition of DCT, $X_0$ can be calculated by $$X_0 = \frac{\sum_{k=0}^{N-1} x_k}{\sqrt{N}}$$

Thus, Equation (18) becomes $$\sigma = \sqrt{\frac{1}{N-1}\left(\sum_{k=0}^{N-1} x_k^2 - \frac{\left(\sum_{k=0}^{N-1} x_k\right)^2}{N^2}\right)}$$

Motion Estimation and Mode Selection Algorithm

Let N be the total number of macroblocks in a frame, M the number of λ values used in motion estimation, and L the total number of a set of macroblock modes of operation.

The optimal macroblock mode of operation can be determined by computing the optimal coding mode $m_i^*$ and optimal motion vector $Mv_i^*$ for the $i^{th}$ macroblock (I=1, 2, ..., N) as follows:

1) Set i=1 in Equation (15).
2) If $m_I$ is a mode that requires motion compensation, an estimate is carried out to determine the best motion vector value of $\lambda_k$ (k=1, 2, ..., M) by minimizing $J_1,k(m)=E_{1,k}+ \lambda_k R_{1,k}^{mv}(m_1)$.

The value of $R_{1,k}^{mv}(m_1)$ may be obtained from a lookup table that is explained later with reference to FIG. 3.

3) If $m_I$ is a mode that does not require motion compensation (such as in intra mode), then $R_{1,k}^{mv}(m_1)$ is set equal to zero.

4) The residual variance $\sigma_{1,k}^2(m_1)$ is then calculated.
5) The number of header bits $R_{1,k}^{hdr}(m_1)$ and the DC bits $R_{1,k}^{DC}(m_1)$ is then determined. This determination may be carried out by using a lookup table.
6) $D_{1,k}^{DC}(m_I)$ is calculated, and $R_1^{total}$ is estimated.
7) $D_{1,k}(m_I)$(where $D_{1,k}(m_1)=D_{1,k}^{DC}(m_1)+\sigma_{1,k}^2(m_1)$ $e^{-\lambda_{R_{1,k}^{AC}}(m_1)}$ is calculated.
8) Steps 1) through 7) are repeated for all values of i (i=1, 2, ..., N) and the macroblock mode $m_i^*$ and the motion vector $MV_i^*$ that yield minimum Di,k($m_i$) is determined as defined by $\{m_i^*, MV_i^*\}=\arg\min[D_{i,k}(m_i)]\{m_i, MV_{i,k}\}$.

Attention is now drawn to FIG. 2, which illustrates the main functional blocks contained in a first embodiment of encoder circuit 205 that is a part of the video processing circuit 105 of FIG. 1. The functional blocks shown in FIG. 2 may be implemented in various forms such as hardware, software, firmware, and one or more combinations thereof. When implemented in hardware for example, the encoder circuit 205 may comprise a hardware circuit that is optionally, communicatively connected to a controller circuit (not shown in FIG. 2) that provides control, information and other signals for operating encoder circuit 205. Encoder circuit 205 and/or controller circuit (not shown in FIG. 2) can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Alternatively, when implemented in software and/or firmware, the encoder circuit 205 may comprise program code resident inside memory devices such as RAMs, ROMs, and magnetic disks. Such memory devices may be part of a computer circuit (not shown in FIG. 2) that performs encoding and optionally other functions as well.

Motion estimation block 210 accepts an input video signal from line 211 and outputs two signals—a prediction residual signal on line 212, and motion vector information on line 213.

Mode selection block 215 accepts the two signals from the motion estimation block 210, and produces a signal comprised of coefficients that is carried on line 214 together with a mode control signal that is carried on line 217.

Run-length and entropy coding block 225 accepts the motion vector signal from the motion estimation block 210 via line 213, and the two signals from the mode selection block 215 on lines 214 and 217. The compressed and/or encoded signal is output from the run-length and entropy coding block 225 on to line 226.

Rate control block 220 accepts a control signal carried on line 219 from the run-length and entropy coding block 225, and produces a quantization parameter signal that is conveyed on lines 216 and 218 to control the data rate of the signals carried on line 214.

FIG. 3 illustrates the main functional blocks contained in a second embodiment of encoder circuit 205 of the video processing circuit 105 of FIG. 1. Generally, in terms of hardware architecture, as shown in FIG. 3, video processing circuit 105 includes a processor 310, memory 305, and one or more input and/or output (I/O) devices 315 (or peripherals) that are communicatively coupled via the local interface 325. While the second embodiment of encoder circuit 205 is shown as a part of memory 305, alternatively, encoder circuit 205 may be implemented as a hardware circuit that is shown in FIG. 3 as a dotted box located external to memory 305, and connected to local interface 325.

The local interface 325 can be, for example but not limited to, one or more buses or other wired or wireless connections, as is known in the art. The local interface 325 may have additional elements, which are omitted for simplicity, such as controllers, buffers (caches), drivers, repeaters, and receivers, to enable communications. Further, the local interface 325 may include address, control, and/or data connections to enable appropriate communications among the aforementioned components, The processor 310 is a hardware device for executing software, particularly that stored in memory 305. The processor 310 can be any custom made or commercially available processor, a central processing unit (CPU), an auxiliary processor among several processors associated with the video processing circuit 105, a semiconductor based microprocessor (in the form of a microchip or chip set), a macroprocessor, or generally any device for executing software instructions.

The memory 305 can include any one or combination of volatile memory elements (e.g., random access memory (RAM, such as DRAM, SRAM, SDRAM, etc.)) and nonvolatile memory elements (e.g, ROM, hard drive, tape, CDROM, etc.). Moreover, the memory 305 may incorporate electronic, magnetic, optical, and/or other types of storage media. Note that the memory 305 can have a distributed architecture, where various components are situated remote from one another, but can be accessed by the processor 310.

The software in memory 305 may include one or more separate programs, each of which comprises an ordered listing of executable instructions for implementing logical functions. In the example of FIG. 3, the software in the memory 305 includes the encoder circuit 205 in accordance with the present invention, a data storage 303 that may store for example, a lookup table of values, and a suitable operating system (O/S) 306. Lookup tables can be used to provide data such as transmission bit rates for various modes of operation. The operating system 306 essentially controls the execution of other computer programs, such as the encoder circuit 205, and provides scheduling, input-output control, file and data management, memory management, and communication control and related services.

The encoder circuit 205 is a source program, executable program (object code), script, or any other entity comprising a set of instructions to be performed. When a source program, then the program needs to be translated via a compiler, assembler, interpreter, or the like, which may or may not be included within the memory 305, so as to operate properly in connection with the O/S 306. Furthermore, the encoder circuit 205 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 315 may include input devices, for example but not limited to, a keyboard, a compact disk (CD) drive, a DVD drive, or a mouse. Furthermore, the I/O devices 315 may also include output devices, for example but not limited to, a printer, display, CD/DVD recorder etc. The I/O devices 315 may further include devices that communicate both inputs and outputs, for instance but not limited to, a modulator/demodulator (modem for accessing another device, system, or network), a radio frequency (RF) or other transceiver, a telephonic interface, a bridge, a router, etc.

When video processing circuit 105 is in operation, the processor 310 is configured to execute software stored within the memory 305, to communicate data to and from the memory 305, and to generally control operations of the video processing circuit 105 pursuant to the software. The data storage 303 and the O/S 306, in whole or in part, but typically the latter, are read by the processor 310 and then executed.

The above-described embodiments of the present invention are merely set forth for a clear understanding of the principles of the invention. Many variations and modifications may be made without departing substantially from the invention. All such modifications and variations are included herein within the scope of this disclosure and the present invention and protected by the following claims. It will also be recognized that the use of the word "optimal" pertains to a selection that is made based upon individual video system applications. While one application, for example, may emphasize a rate-based criteria, a second application for example, may place a greater emphasis on a distortion criteria. Consequently, the definition of the term "optimal" in the first application may be different from that in the second application. All such variances in the definition of the term "optimal" will be apparent to persons of ordinary skill in the art, and all such modifications and variations are included herein within the scope of this disclosure and the present invention and protected by the following claims.

The invention claimed is:

1. A video system comprising:
   a video processing circuit that receives a picture and provides video compression by using an optimal macroblock mode of operation, the optimal macroblock mode of operation being identified by processing at least one macroblock of the picture, the processing being performed independent of other macroblocks contained in the picture, wherein the video processing circuit includes an encoder, the encoder comprising:
   a motion estimation circuit that identifies an optimal motion vector by processing at least one macroblock contained in the picture, wherein the processing is carried out independent of other macroblocks contained in the picture; and
   a mode selection circuit that identifies the optimal macroblock mode of operation, wherein the mode selection circuit identifies the optimal macroblock mode of operation by using a rate-distortion model, where the rate-distortion model comprises an overall macroblock mode distortion D that is defined by a model equation $D=D^{AC}+D^{DC}$, wherein $D^{AC}$ is a distortion due to AC coefficients and $D^{DC}$ is a distortion due to DC coefficients.

2. The video system of claim 1, where $D^{AC}$ is a model equation that is defined by $D^{AC}=k_1 f(\sigma)g(R_{AC})$, wherein $f(\sigma)$ and $g(R_{AC})$ are two functions, $\sigma$ is a measure of deviation of AC coefficients, $R_{AC}$ is an allocated rate for encoding AC coefficients, and $k_1$ is a first numerical parameter that comprises at least one of a fixed number, an estimated number, and a number that is dynamically determined during a frame of the picture.

3. The video system of claim 2, when $f(\sigma)=\sigma^{k_2}$, wherein $k_2$ is a second numerical parameter that comprises at least one of a fixed number, an estimated number, and a number that is dynamically determined during a frame of the picture.

4. The video system of claim 2, when $g(R_{AC})=e^{-k_3 R_{AC}}$, where $k_3$ is a third numerical parameter that comprises at least one of a fixed number, an estimated number, and a number that is dynamically determined during a frame of the picture.

5. The video system of claim 2, when $R_{AC}$ is defined as $R_{AC}=R_{total}-R_{hdr}-R_{mv}-R_{DC}$, wherein $R_{total}$ is a target total number of bits for the at least one macroblock, $R_{hdr}$ is a rate of encoding a header of the at least one macroblock, $R_{mv}$ is a rate of motion vectors, and $R_{DC}$ is a rate of the DC coefficients.

6. The video system of claim 1, wherein $D^{DC}$ is calculated using a mean intensity value over the at least one macroblock, and a quantization is carried out using a fixed step size.

7. The video system of claim 1, wherein $D^{DC}$ is equal to zero.

8. The video system of claim 1, wherein the optimal macroblock mode of operation is selected as one that minimizes the overall macroblock mode distortion D.

9. The video system of claim 1, wherein the signal received from the video signal source is at least one of a JPEG signal, an MPEG-x signal, and an ITU-specified H.26x signal.

10. A video system comprising:
means for receiving a picture and providing video compression by using an optimal macroblock mode of operation, the optimal macroblock mode of operation being identified by processing at least one macroblock of the picture, the processing being performed independent of other macroblocks contained in the picture, wherein the means for receiving a picture and providing video compression includes an encoder, the encoder comprising:
  means for identifying an optimal motion vector by processing at least one macroblock contained in the picture, wherein the processing is carried out independent of other macroblocks contained in the picture; and
  means for identifying the optimal macroblock mode of operation, wherein the means for identifying the optimal macroblock mode of operation identifies the optimal macroblock mode of operation by using a rate-distortion model, where the rate-distortion model comprises an overall macroblock mode distortion D that is defined by a model equation D=DAC+DDC, wherein DAC is distortion due to AC coefficients and DDC is a distortion due to DC coefficients.

11. The video system of claim 10, where $D^{AC}$ is a model equation that is defined by $D^{AC}=k_1 f(\sigma)g(R_{AC})$, wherein $f(\sigma)$ and $g(R_{AC})$ are two functions, $\sigma$ is a measure of deviation of AC coefficients, $R_{AC}$ is an allocated rate for encoding AC coefficients, and $k_1$ is a first numerical parameter that comprises at least one of a fixed number, an estimated number, and a number that is dynamically determined during a frame of the picture.

12. The video system of claim 11, when $f(\sigma)=\sigma^{k_2}$, wherein $k_2$ is a second numerical parameter that comprises at least one of a fixed number, an estimated number, and a number that is dynamically determined during a frame of the picture.

13. The video system of claim 11, when $g(R_{AC})=e^{-k_3 R_{AC}}$, where $k_3$ is a third numerical parameter that comprises at least one of a fixed number, an estimated number, and a number that is dynamically determined during a frame of the picture.

14. The video system of claim 11, when $R_{AC}$ is defined as $R_{AC}=R_{total}-R_{hdr}-R_{mv}-R_{DC}$, wherein $R_{total}$ is a target total number of bits for the at least one macroblock, $R_{hdr}$ is a rate of encoding a header of the at least one macroblock, $R_{mv}$ is a rate of motion vectors, and $R_{DC}$ is a rate of the DC coefficients.

15. The video system of claim 10, wherein $D^{DC}$ is calculated using a mean intensity value over the at least one macroblock, and a quantization is carried out using a fixed step size.

16. The video system of claim 10, wherein $D^{DC}$ is equal to zero.

17. The video system of claim 10, wherein the optimal macroblock mode of operation is selected as one that minimizes the overall macroblock mode distortion D.

18. The video system of claim 10, wherein the signal received from the video signal source is at least one of a JPEG signal, an MPEG-x signal, and an ITU-specified H.26x signal.

* * * * *

UNITED STATES PATENT AND TRADEMARK OFFICE
CERTIFICATE OF CORRECTION

PATENT NO.         : 7,440,502 B2
APPLICATION NO. : 10/706395
DATED              : October 21, 2008
INVENTOR(S)        : Altunbasak et al.

It is certified that error appears in the above-identified patent and that said Letters Patent is hereby corrected as shown below:

IN THE CLAIMS

In col. 14, line 10 (claim 10), delete "D=DAC+DDC" and replace with --D=$D^{AC}+D^{DC}$--.
In col. 14, line 11 (claim 10), delete "DAC" and replace with --$D^{AC}$--.
In col. 14, line 12 (claim 10), delete "DDC" and replace with --$D^{DC}$--.

Signed and Sealed this

Tenth Day of November, 2009

David J. Kappos
*Director of the United States Patent and Trademark Office*